Sept. 18, 1956     F. J. EICHELMAN     2,763,322
TWO-STAGE VALVE FOR TORCH DEVICES
Filed Aug. 25, 1951
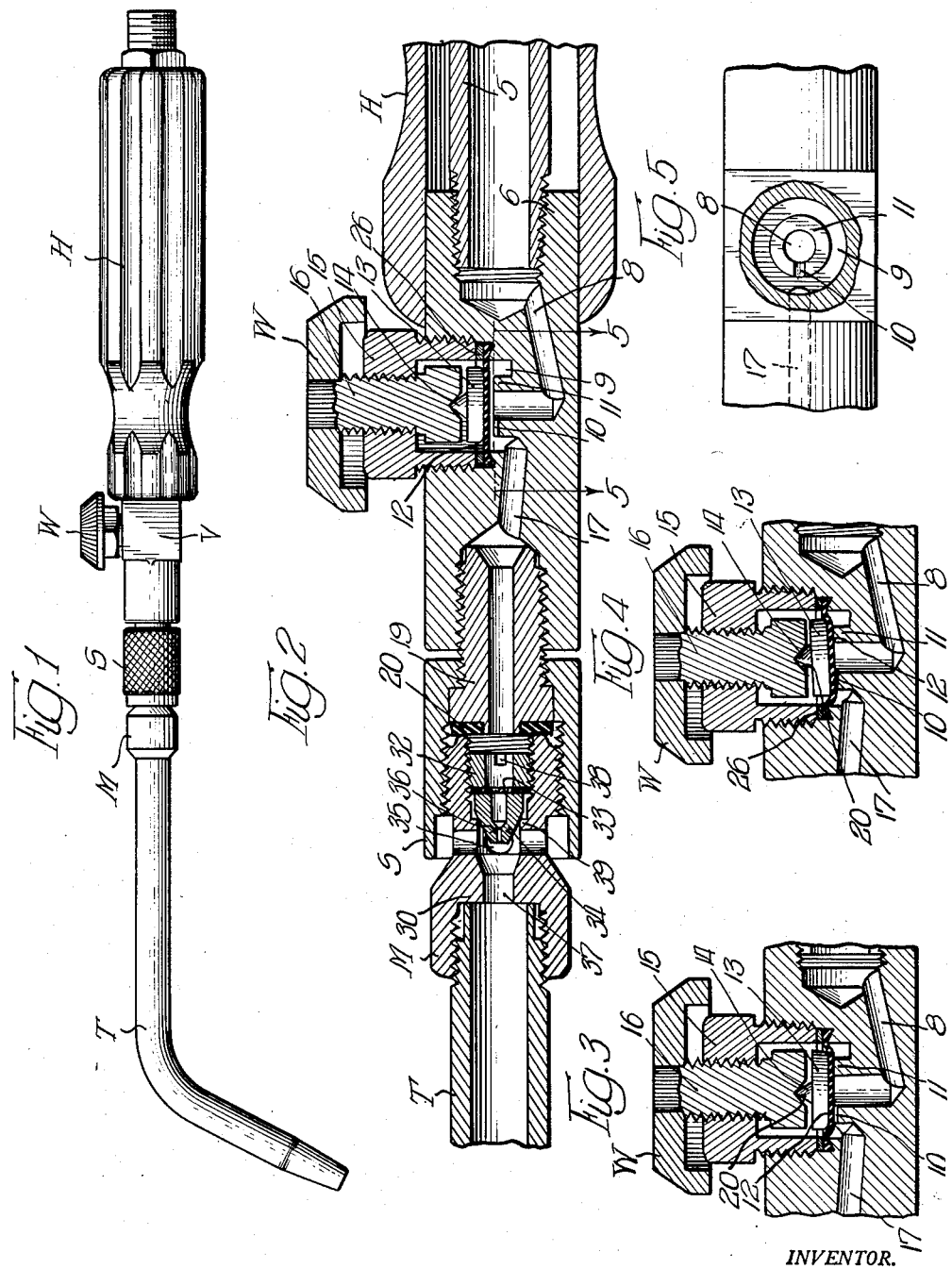
INVENTOR.
Francis J. Eichelman,
BY

United States Patent Office 2,763,322
Patented Sept. 18, 1956

2,763,322

TWO-STAGE VALVE FOR TORCH DEVICES

Francis J. Eichelman, Brookfield, Ill., assignor to National Cylinder Gas Company, Chicago, Ill., a corporation of Delaware Application August 25, 1951, Serial No. 243,663

3 Claims. (Cl. 158—27.4)

My invention is an improvement in torch devices that burn a combustible mixture of air and a fuel gas. More specifically it is concerned with such devices in which the torch is supplied with a fuel gas, such as acetylene or another hydrocarbon gas, and an appropriate quantity of air which is aspirated into the torch from the surrounding atmosphere to form with the fuel gas a combustible mixture that will produce a flame of the desired characteristics. The torch devices of this invention are useful for various purposes, for example, to provide heating flames for welding, brazing and soldering operations.

Torches used for welding, brazing or soldering are subject to an intermittent use, and it has usually been necessary in the past to reestablish the flame and adjust the fuel supply to obtain the appropriate heating flame after each operation. I have found it desirable to be able to regulate the flow of fuel, establish a pilot flame and also completely shut off the flow of gas by means of a single control and one simple two-stage unitary valve. For example, to maintain a pilot flame, the valve continuously passes a small quantity of gas through the torch when it is used intermittently, so that the necessity of reestablishing the flame for each operation is obviated. At the same time, the single control can be instantly manipulated to regulate the flame as desired, or to close the fuel passage completely. The advantages of these features of my new torch device will be apparent.

In general, torch devices for the purposes pointed out above and for related uses should be light, well balanced, rugged, simple and easy to operate. My invention incorporates all these features in a torch device, and its advantages will be apparent.

Among the objects of my invention is to provide a two-stage or differential valve controlling mechanism by means of which fluid flows can be easily and simply regulated.

Another important object of my invention is to provide a torch handle embodying the differential valve and equipped with coupling means, to allow it to be easily and quickly coupled to various torch tips.

A further object of my invention is to provide a simple and light air-fuel gas torch equipped with the novel valve feature outlined above and a burning tip adapted to aspirate air.

Yet another object of my invention is to construct a portable valve and handle which is adapted to be used in conjunction with other elements as a welding or soldering torch.

Other objects of my invention will, in part, be obvious and in part appear hereinafter.

The nature and scope of my invention will be illustrated in one embodiment by the following detailed description taken in connection with the accompanying drawings in which:

Fig. 1 is a front elevational view of my portable valve and handle connected to an air-aspirating welding tip and arranged to function as a heating torch;

Fig. 2 is an enlarged partial longitudinal section through the valve and handle of Fig. 1 showing the valve in fully opened position;

Figs. 3 and 4 are sectional views showing the valve of Fig. 2 partially opened to permit a pilot flow of gas and in fully closed position, respectively;

Fig. 5 is a top view of the valve body taken along the line 5—5 of Fig. 2 and partially broken away to show the construction of the valve seat.

My novel valve and handle assembly as shown in Fig. 1 attached to a soldering or welding tip T includes a handle H, valve body V, valve wheel W, and an internally threaded sleeve S. The tip T is provided with a combination air aspirator and mixer M which is externally threaded to engage the sleeve S.

According to my invention, I have constructed the valve V to provide a two-stage or differential action, and it is attached to the hollow handle H which is in axial alignment with the valve body to provide a gas or fluid passageway on both sides of the valve. The hollow handle H is fitted with a small tube communicating with the valve body and a threaded fitting which may be connected to a source of fuel gas supply by means of a flexible hose or the like.

The valve V is of two stage or differential operation in that initially a very small gas flow is uniformly controlled by regulating the size of the passage through a very small opening. This constitutes the first stage of the valve's operation.

Subsequently, as the valve wheel W is further turned, a diaphragm which regulates the first stage opens to regulate the gas flow through a second and much larger gas passage. This second stage is also uniformly regulated and is quick-opening in nature as soon as the pilot flow has been exceeded.

It can readily be seen that my novel handle unit is extremely efficient, adaptable and easy to operate. One of the signal features exists in the fact that it can be operated with only one hand. By grasping handle H with one hand, valve wheel W can be operated through all stages by the use of the thumb and forefinger of the same hand. By freeing the other hand it is possible to arrange the work pieces or other apparatus more conveniently for operation with the handle unit H.

The assembly of the handle unit H with a soldering, brazing or welding tip T is shown in Fig. 1. Gas flow is controlled by valve wheel W to the desired amount and after passing through the valve V the fuel gas aspirates air from the atmosphere into mixer M, where it is mixed with the fuel gas, and the mixture passes through tip T to be burned at the nozzle. The burning flame which is regulatable by the valve wheel W may then be applied to any one of a number of conventional heating applications, without the necessity of reestablishing the flame after each operation by virtue of the provision of the pilot flame.

Fig. 2 shows the valve body in more detail and in a fully opened position. The conduit 5 forming the gas passage through handle H is in threaded engagement with the rear portion 6 of the valve body. Gas flows through valve passage 8 into the annular valve chamber 9 and thence into valve passage 17 that is in substantially axial alignment with the bore of fitting 19 which is also provided with gasket 20. The sleeve S is held in engagement with the valve body by means of internal threading at the end cooperating with the external threading of fitting 19.

In the valve proper, flexible diaphram 12, preferably formed of rubber as illustrated or of an equivalent elastomer, is sealed in the valve body V by means of valve gland 15 and gasket 26. Valve disc 13 rests upon the diaphragm 12 and is aligned with valve stem 16 by virtue of a conical stud 14 which registers with a recess in the bottom face of the valve stem 16.

Sleeve S is also internally threaded at its open end to permit easy and rapid attachment of auxiliary units to the handle assembly. The auxiliary attachments are thus secured in axial communication with the valve body V and will abut gasket 20 at the inner end of fitting 19 in sealed relation to the valve passage 17.

The valve stem 16 is keyed to and rotated by the knurled valve wheel W.

An important feature in the construction of the valve is to be found in the construction of the annular valve seat 11 that cooperates with diaphragm 12 to control the flow of fluid through the valve. In the top face of seat 11, and at the discharge side of the valve nearest passageway 17 (Figs. 2, 3, and 4), there is provided a shallow pilot groove 10 communicating with passageways 8 and 17 and whose axis is perpendicular to that of the annular valve seat 11. In the closed position as shown in Fig. 4, the valve stem 16, bearing upon the valve disc 13 has forced the flexible diaphragm tightly against the valve seat 11 to completely fill pilot groove 10, thereby cutting off all gas flow through the valve.

In the partialy opened first or pilot flow stage, a small, constant gas flow is permitted, as shown in Fig. 3, since in this stage the valve pressure has been released sufficiently so that the diaphragm 13 continues to press against the valve seat 11, but does not fill the pilot groove 10, which is thus opened for gas flow.

The fully opened position of the valve is shown in Fig. 2, wherein the pressure against the diaphragm 12 is reduced to such an extent that it is no longer in contact with valve seat 11, and permits uninterrupted gas flow through the valve. In this position the gas flow may be regulated for normal operations in the usual way by means of valve wheel W.

In Fig. 5, the moveable valve components have been removed to show the annular valve seat 11 and the pilot groove 10 as it communicates with valve passages 8 and 17 through the annular valve chamber 9.

The air-fuel gas mixer and burning tip employed with my handle assembly is shown in detail in Fig. 2. A bushing 30 serves as a mixer and air aspirator, and is externally threaded at one end to engage sleeve S of the handle assembly, internally threaded at its opposite end to receive the threaded end of a burner tip T. The mixer 30 is provided with an injector 34 having a small axial bore 36 constructed to serve as a venturi. The rapidly expanding fuel gas after passing through the handle flows at a high velocity from bore 36 and aspirates air into mixer 30 through ports 35. The thus mixed air and fuel gas then pass through second restricted bore 37 in the mixer 30, in which the resultant venturi effect is utilized to cause an increase in the velocity and turbulence of the gases, and to accomplish their thorough admixture before combustion.

Upstream of the injector 34 is a filter screen 33 which is held in place by a lock nut 32 which also serves to seat the injector 34 securely against an internal shoulder 39 of the mixer 30. The lock nut 32 is provided with a slot 38 by means of which it can be adjusted in the mixer 30.

While the foregoing invention has been described in its application as being particularly useful in the embodiments shown it is clearly to be understood that it is not to be limited to these examples. For instance, my novel two stage valve could easily be adapted for use with oxy-acetylene torches or in other like apparatus where it is desirable to produce a pilot flow during stand-by operations, and then quickly change to the much larger gas flows required in the welding or cutting application.

Certain changes may be made in the above construction and different embodiments of the device within the scope of my invention will be apparent to those skilled in this art, and are included within the invention as defined by the appended claims, and it will be understood that the above description and the accompanying drawings shall be regarded as merely illustrative.

What is claimed is:

1. Torch device comprising a hollow handle having an internal axially aligned tube constituting a gas passageway therein, one end of said passageway being adapted to be attached to a source of gas supply while the other engages a valve body, said valve body being provided with substantially axial gas ports, one port leading from said passageway to a two-stage manually operable valve while the other leads to the bore of coupling means adapted to connect said device to auxiliary devices, said valve being provided with an annular seat, a shallow radial groove in the surface of the seat for pilot gas flow, a flexible diaphragm adapted to seat on the face and in the groove of the annular seat, a valve disk adjacent said diaphragm provided with a centrally located projection engaging a recess in a valve stem adapted to be regulated by manually operable means.

2. A valve for torch devices comprising a valve body provided with two spaced gas ports leading to and from a two-stage manually operable valve, said valve being provided with an annular seat having a shallow groove in the face thereof, a flexible diaphragm adapted to seat in one position on the face of the annular seat and in another position to seat in and seal the groove of the annular seat, a valve disk adjacent said diaphragm provided with a centrally located projection engaging a recess in a valve stem, said valve stem being adjustable by manually operable means so that flow between said ports can be: completely stopped, permitted to pilot flow through said groove only, and regulated for flows in excess of said pilot flow.

3. Torch device comprising a handle having a tube constituting the longitudinal gas passage therein, one end of said tube being adapted to be connected to a source of fuel gas and its other end communicating with a valve body, said valve body including spaced gas ports, and a two-stage manually operable valve between said ports, one of said ports leading to the bore of a coupling means adapted to connect said device to torch tips and other combustion devices, said two-stage valve being provided with an annular seat, a shallow radial groove in the surface of the seat for pilot gas flows, and a flexible member adapted to seat on the face and in the groove of the annular seat and adjustable by means of a valve stem.

References Cited in the file of this patent

UNITED STATES PATENTS

| Number | Name | Date |
|---|---|---|
| 137,620 | Patterson | Apr. 8, 1873 |
| 1,233,423 | Wallace | July 17, 1917 |
| 1,387,591 | Cooper | Aug. 16, 1921 |
| 1,441,938 | Maynard | Jan. 9, 1823 |
| 1,487,230 | Gaskin | Mar. 18, 1924 |
| 2,054,909 | Morehouse | Sept. 22, 1936 |
| 2,138,800 | Young | Nov. 29, 1938 |
| 2,200,523 | Tuel | May 14, 1940 |
| 2,234,499 | McAllister | Mar. 11, 1941 |
| 2,323,531 | Franck | July 6, 1943 |
| 2,386,978 | Ruhl | Oct. 16, 1945 |
| 2,427,441 | Butts | Sept. 16, 1947 |
| 2,460,647 | Miller | Feb. 1, 1949 |
| 2,679,378 | Uhler | May 25, 1954 |